United States Patent Office 3,294,551
Patented Dec. 27, 1966

3,294,551
5-CARBOCYCLICAMINOTETRAZOLE
SWEETENING AGENTS
Robert M. Herbst, Meridian Township, Ingham County,
Mich., assignor to Eli Lilly and Company, Indianapolis,
Ind., a corporation of Indiana
No Drawing. Filed Feb. 24, 1964, Ser. No. 346,994
12 Claims. (Cl. 99—141)

This invention relates generally to sweetened compositions of matter and the method for using certain compounds as sweetening agents. More particularly, it relates to the method of using compounds which exhibit a sweet taste selected from the group consisting of 5-carbocyclicaminotetrazoles and non-toxic salts thereof and to the resulting compositions formed.

While the various common sugars, in particular sucrose, are extremely useful as sweetening agents, they have a high caloric content per given weight of sample and thus must be avoided on many diets for weight or health reasons. For instance, individuals suffering from diabetes must avoid the use of these sugars as much as possible. Thus, there are a number of reasons for having available an inexpensive sugar substitute.

There are relatively few commercially produced sugar substitutes which exhibit a sweet taste. Presently marketed compounds of the sugar substitute variety are sodium cyclamate and saccharin.

Saccharin is probably one of the oldest known sugar substitutes and exhibits an intensely sweet taste when in the form of a pure compound. However, at the same time, this compound further exhibits a very bitter aftertaste. Even though acceptable as a commercial product, there has been a continuing search for better sugar substitutes.

As a result of the search for a new sugar substitute a new compound was discovered. This compound is sodium cyclamate. The advantage of this compound was that there was no associated bitter aftertaste. However, at the same time, it was found that sodium cyclamate was only one-tenth as sweet as saccharin on a comparative basis. Since the sodium cyclamate was a relatively expensive compound to prepare, it could not be marketed competitively with saccharin in the pure state.

Further development in this field resulted in a composition which was a mixture of saccharin and sodium cyclamate. The advantage gained by preparing this composition was that the saccharin contributed to making a product which was very sweet while the sodium cyclamate acted to reduce the bitter aftertaste associated with saccharin. However, even with this composition there is a distinct bitter aftertaste.

It is therefore an object of this invention to disclose certain novel compositions which exhibit a sweet taste but which have no associated bitter aftertaste.

It is further an object of this invention to disclose certain novel compositions which are sweetened by a non caloric sweetener.

Still further, it is an object of this invention to disclose methods for the use of certain sweetening agents.

Other objects of this invention will become increasingly apparent to those skilled in the art as the description proceeds.

Unexpectedly it has been found that compositions comprising a compound which exhibits a sweet taste selected from the group consisting of 5-carbocyclicaminotetrazoles and non-toxic salts thereof and a material selected from the group consisting of caloric materials and non caloric chemotherapeutic materials for animal consumption, exhibit a pleasantly sweet taste without any associated bitter aftertaste. A further aspect of this invention includes the method of sweetening materials for animal consumption which comprises the step of adding a compound which exhibits a sweet taste selected from the group consisting of 5 carbocyclicaminotetrazoles and non toxic salts thereof to a material selected from the group consisting of caloric materials and non caloric chemotherapeutic materials for animal consumption. A further aspect of this invention includes a composition exhibiting a sweet taste and in dosage unit form comprising between 1 and 50 mg. of a compound which exhibits a sweet taste selected from the group consisting of 5-carbocyclicaminotetrazoles and salts thereof per 100 ml. of a material selected from the group consisting of caloric materials and non-caloric chemotherapeutic materials for animal consumption.

The compounds utilized in this invention are selected from the group of compounds characterized by the chemical name 5-carbocyclicaminotetrazoles and non toxic salts thereof and having the following structural formula:

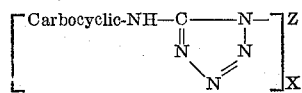

wherein Z is selected from the group consisting of the cation hydrogen, cations of the various elements which will form a non toxic soluble salt and cations of non toxic basic organic materials and X is an integer corresponding to the positive charge on the cation Z. As will be seen from the following discussion, not all of the compounds which will fit into the class defined by the above structural formula are useful as sweetening agents. Further, it will be seen from the following discussion that the compounds which do exhibit a sweet taste follow no logical pattern based upon the structure of the compound and that the only common property known at the present time is that certain compounds exhibit a sweet taste. Further, it will be apparent from the above structural formula that the compounds of this invention are not in any way related to the compounds known to the prior art.

It has been found that certain 5-carbocyclicaminotetrazoles and non-toxic salts thereof exhibit an intensely sweet taste without bitter aftertaste while other 5-substituted aminotetrazole compounds and the non-toxic salts thereof exhibit no taste or are actually sour or bitter. Thus, the following compounds have been found to exhibit this unique sweet taste:

5-cyclohexylaminotetrazole;
5-o-tolylaminotetrazole;
5-m-tolylaminotetrazole;
5-m-methoxyphenylaminotetrazole;
5-m-chlorophenylaminotetrazole;
5-o-chlorophenylaminotetrazole;
5-phenylaminotetrazole and the non-toxic salts of each of these compounds. Further, the non-toxic salts of 5-beta-naphthylaminotetrazole are within this class of compounds.

Many compounds of the same class as those utilized in this invention were tested to determine whether they exhibited a sweet taste. The characteristics of some of these compounds are tabulated as follows:

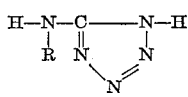

| R | Taste of parent compound | Taste of calcium salt |
|---|---|---|
| Benzyl | Tasteless | Bitter. |
| P-tolyl | ---do--- | Do. |
| o-Methoxy | ---do--- | Do. |
| p-Methoxyphenyl | ---do--- | Do. |
| o-Ethoxyphenyl | ---do--- | Do. |
| m-Ethoxyphenyl | ---do--- | Do. |
| p-Ethoxyphenyl | ---do--- | Do. |
| p-Chlorophenyl | ---do--- | Bitter and Sweet. |
| Alpha-napthyl | ---do--- | Bitter. |

Other compounds not within the general class of 5-carbocyclicaminotetrazoles and non-toxic salts thereof were tested to determine whether they exhibited a sweet taste. The results are tabulated as follows: (Wherein R and R' are attached to the 5-amino group on the tetrazole carbon atom)

| R | R' | Taste of parent compound | Taste of calcium salt |
|---|---|---|---|
| Hydrogen | Hydrogen | Salty; Sour | |
| Acetyl | ---do--- | Tasteless | |
| Methyl | ---do--- | Nutty; Faintly Sour | |
| Ethyl | ---do--- | Sour | |
| Phenyl | Methyl | Tasteless | Bitter. |
| Methyl | ---do--- | ---do--- | |
| Ethyl | Ethyl | Faintly Bitter | |
| Benzyl | Methyl | Tasteless | |
| Do | Ethyl | ---do--- | |
| Do | Cyclohexyl | ---do--- | |
| Allyl | Allyl | Faintly Sour | |
| Isopropyl | Isopropyl | Faintly Bitter | |
| n-Butyl | n-Butyl | Tasteless | |
| Iso-butyl | Iso-butyl | ---do--- | |
| n-Amyl | n-Amyl | ---do--- | |
| Iso-amyl | Iso-amyl | ---do--- | |

Based upon the considerable number of compounds tested and found to exhibit a sweet taste an attempt was made to correlate this property with some other property of the above compounds. However, the attempt proved to be fruitless. Thus, the only characteristic which may be suitably used to characterize the compounds of this invention is that they are compounds selected from a group consisting of 5-carbocyclicaminotetrazoles and the non-toxic salts thereof which exhibit a sweet taste. As appears from the active compounds discussed above the compounds which exhibit the sweet taste are within a relatively narrow group. It has been determined that compounds outside of the grouping of 5-carbocyclicaminotetrazoles and non-toxic salts thereof do not exhibit a sweet taste.

Some of the 5-carbocyclicaminotetrazoles and their non-toxic salts utilized in this invention are known to the prior art. Disclosures for the method of preparation of some of these compounds are found in the prior art. Attention is particularly called to the following references: R. A. Henry et al., JACS, vol. 76, pg. 88 (1954); R. A. Henry et al., JACS, vol. 18, pg. 779 (1953); R. Stolle et al., J. prakt Chem., vol. 124, pg. 261 (1930); R. Stolle et al., J. prakt Chem., vol. 134, pg. 282 (1932) and R. Stolle et al., J. prakt Chem., vol. 147, pg. 286 (1937).

In the preparation of 5-carbocyclicaminotetrazoles normally a 1-carbocyclic 5-aminotetrazole compound is prepared and then rearranged to form the product. The 5-carbocyclicaminotetrazoles also can be prepared directly. While there are other described methods for the preparation of some of the compounds disclosed in this invention the following is a description of the methods which were utilized to prepare the compounds of this invention.

EXAMPLE I

*1-phenyl-5-aminotetrazole*

*Procedure A.*—A sludge of 152 g. of N-phenylthiourea in 300 ml. of absolute ethanol in a one liter round bottomed flask equipped with a reflux condenser was chilled in an ice bath. A total of 150 g. of methyl iodide was added to the sludge in several portions during half an hour taking care to mix the reactants thoroughly after each addition of methyl iodide. The reaction mixture was allowed to warm to room temperature slowly as the ice in the cooling bath melted and was then kept at room temperature for 40 hours. Finally, after the mixture was boiled under reflux for one hour excess methyl iodide was removed while about 100 ml. of ethanol was distilled from the reaction flask. The residual ethanolic solution of N-phenyl-S-methylthiouronium iodide was diluted with 200 ml. of absolute ethanol. The solution was cooled in an ice bath while 59 g. of 85% hydrazine hydrate solution was added slowly. An initial precipitate formed but redissolved as the reaction mixture was warmed slowly to reflux temperature. Methyl mercaptan was evolved rapidly as the solution was warmed on a steam bath and was absorbed in a suitable trap charged with aqueous sodium hydroxide. The reaction mixture was boiled under reflux for two hours after the vigorous evolution of methyl mercaptan subsided and then stored at room temperature over night. As much ethanol as possible was removed from the reaction mixture by distillation under reduced pressure from a warm water bath. The syrupy residue was dissolved in 300 ml. of water and again subjected to distillation under reduced pressure until about 200 ml. of distillate had collected.

The aqueous solution of N-phenyl-N'-aminoguanidine hydriodide was diluted with 500 ml. of water, acidified with 10 ml. of concentrated nitric acid and treated with a solution of 170 g. of silver nitrate in 250 ml. of water, the latter added dropwise with continuous stirring during half an hour. Excess silver ion was removed by addition of 10 ml. of concentrated hydrochloric acid after which the suspension was stirred at room temperature for an hour. The silver halides were removed by suction filtration and were washed carefully with cold water. The combined filtrate and washings were stirred and cooled to +5° C., in an ice bath when a solution of 69 g. of sodium nitrite in 200 ml. of water was added slowly at a rate such that the temperature remained between +5 and 10° C. A solid separated from the reaction mixture during the diazotization procedure. The suspension was brought to pH 8 by the careful addition of aqueous potassium hydroxide solution, warmed to 35° C., and then allowed to cool slowly to room temperature. After chilling the suspension thoroughly in an ice bath the crude 1-phenyl-5-aminotetrazole was collected on a filter, washed with cold water and dried at 100° C. Recrystallization of the material from 50% aqueous isopropyl alcohol, using charcoal to decolorize the solution, gave 113 g. of pure product that melted at 159–160° C., and on continued heating resolidified and then remelted at 199–200° C.

*Procedure B.*—A three liter, 3-necked flask equipped with a stirrer, a dropping funnel, a thermometer and an exhaust tube was arranged for cooling in an ice bath. The flask was charged with 167 g. of bromine and 17 ml. of water after which a solution of 56.7 g. of sodium cyanide in 400 ml. of water was added dropwise at a rate such that the temperature of the reaction mixture remained below 30° C. The cyanogen bromide so formed was brought into solution by addition of 450 ml. of 95% ethanol. An ice-salt bath was substituted as the cooling medium and with continuous stirring a solution of 93 g. of aniline in 250 ml. of 95% ethanol was added dropwise keeping the temperature below 100° C. Under the same conditions a solution of 40 g. of sodium hydroxide in 100 ml. of water was added dropwise. Still keeping the temperature below 10° C., and stirring the reaction mixture a solution of 70 g. of sodium azide in 200 ml. of water was added, followed by 90 ml. of concentrated hydrochloric acid diluted with an equal volume of water. The homogenous reaction mixture was transferred to a steam bath, equipped with a reflux condenser and boiled under reflux for six hours after which about 300 ml. of solvent was removed by distillation at atmospheric pressure. The residual aqueous ethanolic solution was cooled thoroughly in an ice bath and the crystalline 1-phenyl-5-aminotetrazole that separated was collected on a Buchner funnel, washed with cold 30% ethanol and dried at 100° C. The crude product was practically colorless and melted at 158–160° C., resolidifying on continued heating and then remelting at 198–200° C. The yield was 125 g. Further evaporation of the reaction mixture gave a small additional quantity of somewhat less pure material contaminated with aniline. The latter was removed by washing with ether.

The formula of the product is:

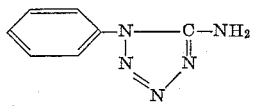

EXAMPLE II

1-m-tolyl-5-aminotetrazole

A solution of 21.4 g. of m-toluidine in 120 ml. of 95% ethanol was placed in a one liter, 3-necked flask equipped with a stirrer, a dropping funnel, a thermometer and an exhaust tube. With external cooling to keep the temperature of the reaction mixture below +10° C., a solution of 21.2 g. of cyanogen bromide in 80 ml. of 50% ethanol was added dropwise with continuous stirring. Under the same conditions a solution of 8 g. of sodium hydroxide in 20 ml. of water was added, followed by a solution of 15 g. of sodium azide in 55 ml. of water and 18 ml. of concentrated hydrochloric acid diluted with 18 ml. of water. The reaction flask was equipped with a reflux condenser, transferred to a steam bath and the mixture boiled under reflux for six hours. At the end of the reaction period about 120 ml. of solvent was removed by distillation on the steam bath. The residual aqueous alcoholic solution was chilled thoroughly in an ice bath. The product crystallized and was removed by filtration and washed with cold 30% ethanol before drying at 100° C. The crude 1-m-tolyl-5-aminotetrazole so obtained was recrystallized from 50% isopropyl alcohol from which it separated as lusterous needles melting at 165–166° C. The yield of pure product was 21 g.

The formula of the compound is:

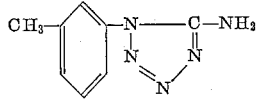

EXAMPLE III

1-m-chlorophenyl-5-aminotetrazole

To a solution of 12.7 g. of m-chloroaniline in 100 ml. of 95% ethanol was added slowly, with cooling, a solution of 10.6 g. of cyanogen bromide in 50 ml. of 95% ethanol. The resulting solution was warmed on the steam bath under a reflux condenser for 20 minutes after which hydrogen bromide was neutralized by addition of 6.9 g. of anhydrous potassium carbonate and the solvent was removed by distillation under reduced pressure from a warm water bath. The residue was extracted with 50 ml. of warm benzene. The benzene solution of m-chlorophenyl-cyanamide so formed was transferred to a pressure bottle, cooled in an ice bath and then treated with 40 ml. of a 15% solution of hydrazoic acid in benzene. The pressure bottle was sealed and heated for seven hours in a well shield steam bath. 1-m-chlorophenyl-5-aminotetrazole separated from the benzene during the course of the reaction. After cooling the reaction mixture in an ice bath, the solid product was collected on a filter and washed with benzene. The air-dried product was recrystallized from 90% isopropyl alcohol from which it separated as colorless leaflets that melted at 173–174° C., resolidified on continued heating and then remelted at 198–200° C.

The formula of the compound is:

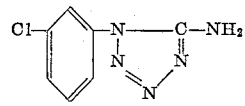

EXAMPLE IIIa

1-m-methoxyphenyl-5-aminotetrazole

To a cooled solution of 12.3 g. of m-anisidine in ether in which was suspended 6.9 g. of anhydrous potassium carbonate was added dropwise with stirring a solution of 10.6 g. of cyanogen, bromide in 50 ml. of ether. The mixture was stirred at room temperature for several hours after which the supernatant was decanted into 100 ml. of ether containing 5 g. of hydrazoic acid. The ether solution was boiled gently under reflux for about ten hours during which considerable solid separated from the mixture. The solid was separated by filtration, after cooling the ether suspension thoroughly in an ice bath, and recrystallized from 30% isopropyl alcohol from which it separated as glistening crystals that melted at 140–141° C.

The compound has the formula:

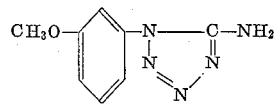

EXAMPLE IV

1-B-naphthyl-5-aminotetrazole

A solution of 20.4 g. of B-naphthylamine in 150 ml. of 95% ethanol was prepared in a one liter, 3-necked flask equipped with a stirrer, a dropping funnel, a thermometer and an exhaust tube. While keeping the temperature below 25° C., by occasional external cooling with an ice bath, a solution of 15 g. of cyanogen bromide in 80 ml. of 95% ethanol was added dropwise with continuous stirring. This was following immediately by a solution of 5.7 g. of sodium hydroxide in 20 ml. of water, added to the reaction mixture under similar conditions. The solid that separated during the addition of sodium hydroxide was redissolved by warming the reaction mixture to 50° C. for 15 minutes. After cooling the mixture to room temperature again, solutions of 11.3 g. of sodium azide in 35 ml. of water and 8 g. of concentrated sulfuric acid in 30 ml. of water were added successively. The resulting mixture was placed on a steam bath, the flask equipped with a reflux condenser and the mixture boiled under reflux for eight hours. About 100 ml. of solvent was then removed by distillation at atmospheric pressure. The product separated from the residual solution on cooling as an almost colorless, crystalline solid. The crude product was contaminated with a small amount of B-naphthylamine that was removed by washing the crude material with warm ethylene chloride. Recrystallization of the remaining solid from 95% ethanol gave 14.5 g. of pure 1-B-naphthyl-5-aminotetrazole as a colorless crystalline solid melting at 191–192° C., and resolidifying on continued heating to remelt again at 211° C.

The compound has the following formula:

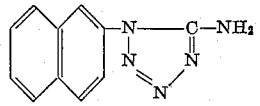

EXAMPLE V

5-cyclohexylaminotetrazole

A solution of 5 g. of 5-benzylcyclohexylaminotetrazole in 100 ml. of absolute ethanol was shaken with 3 g. of 5% palladium-charcoal under hydrogen at 50 p.s.i. at about 60° C., in a Burgess-Parr low pressure hydrogenation apparatus for about 24 hours. After complete hydrogenolysis of the benzyl group, the catalyst was removed by filtration and washed with hot water. The combined filtrate and washings were evaporated to dryness under reduced pressure on a water bath and the residual 5-cyclohexylaminotetrazole was recrystallized from aqueous ethanol. The yield of pure, crystalline product was 3.2 g., the melting point is 195° C.

The compound has the formula:

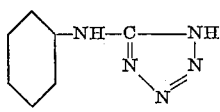

EXAMPLE VI

5-benzylaminotetrazole

A suspension of 85 g. of anhydrous 5-aminotetrazole in 400 ml. of water was treated with 69 g. of anhydrous potassium carbonate. To the clear solution obtained on warming the mixture gently, 126.5 g. of benzyl chloride and 250 ml. of 95% ethanol were added. The mixture was boiled under reflux for three hours, then diluted with an equal volume of water and chilled thoroughly in an ice bath. The mixture of benzylated aminotetrazoles that separated from the solution was collected on a Buchner funnel, washed with cold water and air-dried. The crude product was extracted with several portions of benzene. The benzene-insoluble material was suspended in 250 ml. of 10% aqueous sodium hydroxide solution and shaken thoroughly before cooling in an ice bath and filtering off the insoluble material. The isoluble portion is a mixture of 1-benzyl-5-aminotetrazole and 1-benzyl-5-benzylaminotetrazole. The clear, aqueous alkaline filtrate was heated to the boiling point and acidified to Congo red with hydrochloric acid. 5-benzylaminotetrazole crystallized from the hot solution as it was acidified. The suspension was cooled, the product collected on a Buchner funnel and then recrystallized from 50% isopropyl alcohol; it melted at 186–187° C.

The formula of the compound is:

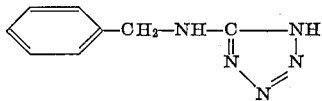

EXAMPLE VII

5-phenylaminotetrazole

A suspension of 122 g. of 1-phenyl-5-aminotetrazole in 800 ml. of xylene was boiled under reflux with continuous stirring for one and a half hours. The original solid dissolved almost completely in the boiling xylene after which the product began to separate rapidly as heating was continued. The resulting suspension was cooled thoroughly in an ice bath, the product was filtered by suction, pressed as free of xylene as possible, washed with benzene and air-dried. The crude product weighed 119 g. and melted at 205–206° C. The material was recrystallized from 70% isopropyl alcohol using a little charcoal to decolorize the hot solution. The recrystallized material melted at 209° C., when heated rapidly to the melting point, at 206° C., on slower heating. The yield of recrystallized product was 113 g.

The compound has the following formula:

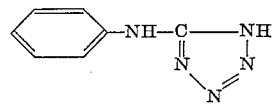

EXAMPLE VIII

5-methylphenylaminotetrazole

A solution of 24 g. of N-methylaniline in 150 ml. of 95% ethanol was placed in a one liter, 3-necked flask equipped with a stirrer, a dropping funnel, a thermometer and an exhaust tube. With continuous stirring and occasional external cooling to keep the temperature below 25° C., a solution of 24 g. of cyanogen bromide in 80 ml. of 50% ethanol was added dropwise. Similarly, a solution of 9 g. of sodium hydroxide in 20 ml. of water was added slowly after which the reaction mixture was stirred at room temperature for two hours. Finally, a solution of 19 g. of sodium azide in 60 ml. of water was added slowly followed by 23.5 ml. of concentrated hydrochloric acid diluted with 23.5 ml. of water. The reaction vessel was now equipped with a reflux condenser, transferred to a steam bath and the mixture boiled under reflux for nine hours. The apparatus was then arranged for downward distillation and heating was continued until about 160 ml. of distillate had collected. On cooling the reaction mixture a solid separated along with an appreciable amount of oily material. The entire crude product was taken up in either and the aqueous reaction mixture was extracted with ether. The combined ether solutions were shaken with 200 ml. of 10% aqueous sodium hydroxide solution. The acidification of the aqueous alkaline extracts caused precipitation of the product as an oil that was easily induced to solidify on cooling in an ice bath. The product was recrystallized from water after which it melted at 139–140° C.

The formula of the product is:

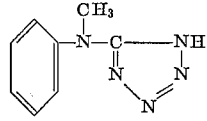

EXAMPLE IX

5-m-tolylaminotetrazole

A suspension of 5 g. of 1-m-tolyl-5-aminotetrazole in 50 ml. of xylene was boiled under reflux for one and a half hours. A clear solution of the starting material in the boiling xylene formed, and as heating was continued the product separated rapidly from the boiling solvent. After cooling the suspension thoroughly in an ice bath, the solid was collected on a filter, washed with benzene and air-dried. The crude product was dissolved in 50 ml. of 5% aqueous sodium hydroxide solution. About 200 mg. of insoluble starting material was recovered by filtration. The clear filtrate was heated almost to the boiling point and then acidified to Congo red by careful addition of concentrate hydrochloric acid to precipitate the product. After cooling the aqueous suspension in an ice bath, the product was collected on a Buchner funnel, washed with cold water and dried at 100° C. The crude product was recrystallized from 50% isopropyl alcohol from which it separated as colorless needles melting at 196–197° C., on rapid heating. The yield of pure product was 3.4 g.

The product has the following formula:

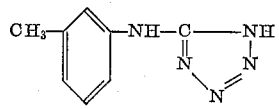

EXAMPLE X

*5-o-methoxyphenylaminotetrazole*

Five grams of 1-o-methoxyphenyl-5-aminotetrazole in a 200 ml. flask was placed in an oil bath preheated to 170° C. As the bath temperature was raised slowly to 190° C., the solid melted completely and then resolidified while in the hot bath. The resolidified material was removed from the bath, cooled quickly to room temperature and suspended in a solution of 2 g. of sodium hydroxide in 50 ml. of water. The solid was almost completely soluble in the aqueous alkali; the solution was colored rather intensely purple. After a trace of insoluble material had been removed by filtration, the clear aqueous solution was heated almost to the boiling point and then acidified to Congo red by dropwise addition of concentrated hydrochloric acid. The color was discharged on acidification and the product precipitated as an almost colorless crystal powder. After thoroughly cooling the aqueous suspension in an ice bath, the product was collected on a Buchner funnel, washed with cold water and dried at 100° C. The product was recrystallized from 75% ethanol from which it separated as colorless needles that melted at 211–212° C. The yield of recrystallized product was 4.2 g.

The formula of the product is:

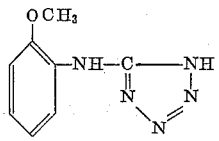

EXAMPLE XI

*5-m-methoxyphenylaminotetrazole*

A solution of 5.5 g. of 1-m-methoxyphenyl-5-aminotetrazole in 30 ml. of 5-ethyl-2-methylpyridine was boiled under reflux for three hours. The solvent was removed as completely as possible by distillation under reduced pressure. The residue was suspended in 150 ml. of water and any residual ethylmethylpyridine was removed by steam distillation. The resulting aqueous suspension was made alkaline by addition of 2 g. of sodium hydroxide. The crude product was almost completely soluble in the aqueous alkaline medium. The resulting purple solution was filtered to remove a small amount of insoluble material. The clear filtrate was heated almost to the boiling point and then made acid to Congo red by dropwise addition of concentrated hydrochloric acid. Acidification caused discharge of the color and precipitation of the product. The aqueous suspension was cooled in an ice bath, the solid was collected on a filter by suction, washed with cold water and dried at 100° C. The crude product was recrystallized twice from 30% isopropyl alcohol using charcoal to decolorize the solution. The yield of pure, colorless, crystalline product was 2.8 g., the melting point was 179–180° C. The mother liquors from the recrystallizations gave about 2.1 g. of a low melting material that appeared to be a mixture of the product with the starting material formed by rearrangement in the hot solvent during recrystallization.

The product has the formula:

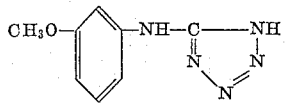

EXAMPLE XII

*5-m-chlorophenylaminotetrazole*

A solution of 4.7 g. of 1-m-chlorophenyl-5-aminotetrazole in 30 ml. of warm 5-ethyl-2-methylpyridine was boiled under reflux for three hours. The solvent was then removed as completely as possible by distillation under reduced pressure. The residue was suspended in about 150 ml. of water and subjected to steam distillation to remove the ethylmethylpyridine completely. The resulting aqueous suspension was made alkaline by addition of 2 g. of sodium hydroxide. The alkaline solution of the product was separated from a trace of insoluble material by filtration. The clear, purple filtrate was heated almost to the boiling point and then made acid to Congo red by dropwise addition of concentrated hydrochloric acid. Acidification discharged the color of the solution and precipitated the product as a fine crystal powder. The aqueous suspension was cooled thoroughly in an ice bath, the solid collected on a filter by suction, washed with cold water and dried at 100° C. The crude product was recrystallized from 50% ethanol, using charcoal to decolorize the solution. It crystallized as colorless rods in a yield of 3.2 g., and melted at 202–203° C.

The compound has the following formula:

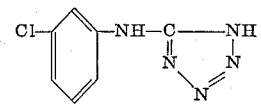

EXAMPLE XIII

*Sodium salt of 5-phenylaminotetrazole—
(Sodium phenylaminotetrazolate)*

A suspension of 32.2 g. of 5-phenylaminotetrazole in a solution of 10.6 g. of anhydrous sodium carbonate in 200 ml. of water was heated gently with continuous stirring until a clear solution formed. Foaming was controlled by the occasional addition of a few drops of 95% ethanol. The resulting golden-colored, warm solution was stirred for 10 minutes with 5 g. of decolorizing charcoal. The colorless filtrate was then evaporated to dryness. The crystalline residue was recrystallized from 600 ml. of acetone from which the product separated as long glistening needles that lost their luster and disintegrated into a fine powder on drying. The sodium salt melts at 293° C., with decomposition, and is freely soluble in cold water. The yield of pure product was 33 g. The salt could also be recrystallized from a small volume of hot water from which it separated as dense prisms.

The formula of the salt is:

EXAMPLE XIV

*Calcium salt of 5-phenylaminotetrazole—
(Calcium phenylaminotetrazolate)*

A suspension of 1.61 g. of 5-phenylaminotetrazole and 0.37 g. of calcium hydroxide in 100 ml. of water was warmed and shaken until complete solution was effected. A faint turbidity was removed by filtration and the clear, intensely sweet filtrate was evaporated to dryness.

The colorless, crystalline residue of calcium salt was recrystallized by dissolving it in the minimum amount of hot 65% ethanol and diluting the clear, hot solution with four volumes of acetone. The calcium salt darkened but did not melt below 300° C.

The calcium salt has the formula:

EXAMPLE XV

*Sodium salt of 5-m-chlorophenylaminotetrazole—*
*(Sodium m-chlorophenylaminotetrazolate)*

A solution of 0.98 g. of 5-m-chlorophenylaminotetrazole in 10 ml. of 0.5 N aqueous sodium hydroxide was evaporated to dryness. This sodium salt remained as a colorless, crystalline solid that failed to melt below 250° C. The sodium salt is readily soluble in cold water; its aqueous solutions exhibit an intensely sweet taste.

The formula of the sodium salt may be written as follows:

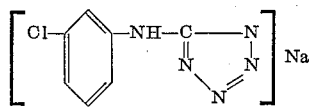

EXAMPLE XVI

*Calcium salt of 5-m-chlorophenylaminotetrazole—*
*(Calcium m-chlorophenylaminotetrazolate)*

A suspension of 0.98 g. of 5-m-chlorophenylaminotetrazole and 0.19 g. of calcium hydroxide in 50 ml. of warm water was shaken until the organic compound dissolved. A slight turbidity was removed by filtration. The intensely sweet, clear filtrate was evaporated to dryness leaving the calcium salt as a colorless, crystalline solid, readily soluble in water. The calcium salt darkened but did not melt on heating to 300° C.

The formula of the salt may be written as follows:

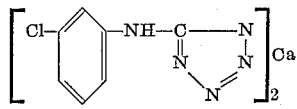

EXAMPLE XVII

*Sodium salt of 5-m-tolylaminotetrazole—*
*(Sodium m-tolylaminotetrazolate)*

To a solution of 0.53 g. of anhydrous sodium carbonate in 50 ml. of water was added 0.88 g. of 5-m-tolylaminotetrazole. The suspension was warmed and stirred until a clear solution resulted. The intensely sweet solution was evaporated to dryness leaving the sodium salt as a colorless, crystalline residue that was freely soluble in water. The sodium salt failed to melt when heated to 250° C.

The sodium salt has the following formula:

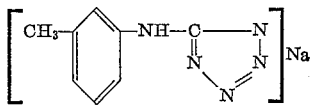

EXAMPLE XVIII

*Calcium salt of 5-m-tolylaminotetrazole—*
*(Calcium m-tolylaminotetrazolate)*

A suspension of 0.88 g. of 5-m-tolylaminotetrazole and 1.19 g. of calcium hydroxide in 50 ml. of water was warmed and shaken until the organic compound dissolved. The faintly turbid solution was filtered and the intensely sweet, clear filtrate was evaporated to dryness. The calcium salt remained as a colorless, crystalline solid that failed to melt, but darkened, on heating to 300° C.

The formula of the calcium salt may be written as follows:

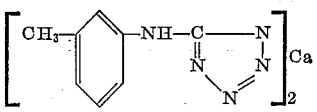

The procedures of Examples I–XVIII were used to prepare the 5-carbocyclicaminotetrazole compounds which exhibit a sweet taste as well as other compounds of this group which also were taste tested. Thus 5-o-tolylaminotetrazole can be prepared using the procedures of Examples II and IX; 5-o-chlorophenylaminotetrazole can be prepared by the procedures of Examples III and XII and 5-beta-naphthylaminotetrazole can be prepared by rearrangement of the 1-B-napthyl-5-aminotetrazole of Example IV by the procedure of Examples VII, IX, X, XI and XII. Any of the salts of the 5-carbocyclicaminotetrazoles can be formed by the procedures of Examples XIII–XVIII.

The 1-carbocyclic-5-aminotetrazoles can be prepared by the methods of Example I, procedure A or B, the latter procedure being preferred. Procedure B is illustrated as follows:

(1) $NaCN + Br_2 \rightarrow BrCN\ NaCN$ (2) $BrCN + Carbocyclic—NH_2 + NaN_3 + HCL \rightarrow$ 1-carbocyclic-5-aminotetrazole The cyanogen bromide (1) is taken into an organic solvent solution upon formation. The cyanogen bromide is then reacted with a carbocyclic amine (2), which may be N substituted as in Example VIII, in the presence of the organic solvent, maintaining the temperature at less than about 50° C., while adding an inorganic alkali material such as sodium hydroxide. Maintaining the temperature at less than about 50° C., sodium azide in a water solution followed by a strong acid, preferably hydrochloric acid, is added to the reaction mixture or alternatively solutions of hydrazoic acid in organic solvent can be used in place of the sodium azide and acid combination. The resulting reaction mixture is then heated and refluxed to produce the 1-carbocyclic-5-aminotetrazole product, which can then be purified by various conventional means.

The rearrangement of the 1-carbocyclic-5-aminotetrazole to the 5-carbocyclicaminotetrazole is accomplished by heating in an organic solvent and then cooling to crystallize the product. Various purification procedures can be used.

The physiology of the compounds of this invention which exhibit a sweet taste is not understood. There seems to be no logical basis for determining whether a 5-carbocyclicaminotetrazole or non-toxic salt thereof will exhibit a sweet taste. Thus, simple structural changes appear to greatly affect the activity of the compound. However, typically the soluble salts of the parent compounds which exhibit a sweet taste are also sweet. The exception to this is that the parent compound of the soluble salt of 5-beta-naphthylaminotetrazole does not exhibit a sweet taste.

The term soluble salts as used in this invention include those cationic materials which will act with the 5-carbocyclicaminotetrazoles to form a salt. With respect to inorganic materials it has been found that the cations of the sodium, potassium and calcium are best suited for the formation of a salt. This is particularly true from a viewpoint of the toxic effect of the compounds as well as considerations of economy. Further however, it must be appreciated that the compounds of this invention being acidic in character will react with various organic bases to form salts. Thus, for instance, the compounds of this invention will react with amines or alkaloids. Thus for instance amphetamine 5-phenylaminotetrazolate (M.P. 136°–138° C.); ephedrine 5-phenylaminotetrazolate (separated as hydrate, M.P. 99°–100° C.); ephedrine 5-m-chlorophenylaminotetrazolate (M.P. 105°–106° C.); and quinine 5 - m - chlorophenylaminotetrazolate (209°–211° C.) all had a distinctly sweet taste. Many of the compounds that are within the class with amines and alkaloids are very useful pharmaceutically but exhibit an intensely bitter taste. It has been found that if the compounds of this invention are reacted with such amines or alkaloids the resultant salt product compound is not bitter and in many cases exhibits the sweet taste of the 5-carbocyclicaminotetrazole compounds. Thus the term salts as used in this invention shall be taken to include inorganic as well as organic cations in combination with the 5-carbocyclicaminotetrazoles.

A number of compositions of matter were prepared and tested in order to determine the most acceptable dosage level for 5-carbocyclicaminotetrazoles and non-toxic salts thereof in combination with various materials for animal (e.g. human) consumption. The following preparations are illustrative:

EXAMPLE XIX

Five mg. of 5-phenylaminotetrazole as the sodium salt was added to a cup of coffee. It was found that this compound went easily into solution and upon taste testing it was determined that the sweetness was roughly equivalent to that of coffee sweetened with sugar. (i.e. sucrose).

EXAMPLE XX

Two mg. of 5-m-chlorophenylaminotetrazole as the sodium salt was added to a cup of coffee as in Example XIX. Again it was found that the resulting product exhibited a sweet taste which was equivalent to that of sugar.

EXAMPLE XXI

Fifty mg. of 5-o-chlorophenylaminotetrazole was added to 100 ml. of fresh peaches in a water solution. The resulting product exhibited a pleasantly sweet taste and on the order of magnitude of sucrose.

EXAMPLE XXII

Five mg. of 5-phenylaminotetrazole was used in preparing applesauce for every 100 ml. of total ingredients used. The result was a pleasantly sweetened applesauce with the characteristic taste of applesauce with sucrose added.

The above illustrative examples were repeated using a number of products which are normally sweetened. In each case it was found that the resulting product exhibited a sweet taste which was characteristic of that of sucrose. Further, the various 5-carbocyclicaminotetrazoles and salts thereof which exhibit a sweet taste were incorporated into materials which were subsequently subjected to baking operations. No decomposition as a result of heating was found. Further, it was found that depending upon the application, the acceptable dosage unit was between 5 mg. and 50 mg. for properly sweetened materials. The upper dosage unit was used in pharmaceutical products to make them more palatable.

The phrase "materials for animal consumption" as used in this disclosure includes dry materials as well as aqueous solutions. The phrase also includes water per se. In normal practice the compositions of this invention would be used for human consumption. However, in certain instances such compositions may be prepared for animals other than human for various reasons.

It is further contemplated that the compounds of this invention may be combined with other sugar substitutes for various reasons. Thus, combinations of the 5-carbocyclicaminotetrazoles and salts thereof which exhibit a sweet taste may be made with saccharin and/or sodium cyclamate. However, as will be appreciated, no particular advantage is gained by such compositions.

All of the compounds of this invention have been tasted by numerous persons without any adverse effect. However, in order to determine the safety of these compounds as compared to sodium cyclamate and saccharin, a study was made of acute toxicity. In particular, 5-phenylaminotetrazole was selected from this determination. It was found that the 5-phenylaminotetrazole was 6 to 7 times more toxic than saccharin by the oral route and 2.5 to 3 times more toxic by the intravenous route. However, on an acute basis there is a very large margin of safety. Thus, the LD 50 in mg. of sample per kg. weight of the animal, in this case male mice, for 5-phenylaminotetrazole, saccharin and sodium cyclamate are as follows:

| Compound | Intravenous | Oral |
| --- | --- | --- |
| 5-phenylaminotetrazole | 870 | 1,500 |
| Saccharin sodium | 2,400 | 8,700 |
| Cyclamate sodium | 2,225 | 10,800 |

Thus, it will be appreciated by those skilled in the art that the 5-carbocyclicaminotetrazoles and non-toxic salts thereof utilized in this invention have a very large margin of safety based upon the acute toxicity.

The 5-carbocyclicaminotetrazole compounds of the present invention are used in prepared compositions which contain a material selected from the group consisting of caloric materials and non caloric chemotherapeutic materials. Caloric materials include all food materials for animal consumption which have some food or caloric value. Chemotherapeutic materials include medicines of all kinds, food supplements such as vitamins and the like. All these materials are included within the scope of the present invention.

Specific compositions have been disclosed in this invention along with the methods of preparation and use of particular compositions. However, it is the intention to include in this invention all 5-carbocyclicaminotetrazoles and non-toxic salts thereof which exhibit a sweet taste and that this invention is to be limited only by the hereinafter appended claims.

I claim:
1. The method of sweetening caloric materials and non-caloric chemotherapeutic materials for animal consumption which comprises:
   (a) the step of adding a compound which exhibits a sweet taste selected from a group consisting of 5-carbocyclicaminotetrazoles and the non-toxic salts thereof to said materials.
2. The method of claim 1 wherein said compound is 5-cyclohexylaminotetrazole.
3. The method of claim 1 wherein the compound is 5-m-methoxyphenylaminotetrazole.
4. The method of claim 1 wherein said component is 5-m-tolylaminotetrazole.
5. The method of claim 1 wherein said compound is 5-m-chlorophenylaminotetrazole.
6. The method of claim 1 wherein said compound is 5-phenylaminotetrazole.
7. A composition useful for animal consumption and in dosage unit form comprising:
   (a) between 1 and 50 mg. of a compound which exhibits a sweet taste selected from the group consisting of 5-carbocyclicaminotetrazoles and salts thereof per 100 ml. of a material for animal consumption.
8. The composition of claim 7 wherein said compound is 5-m-chlorophenylaminotetrazole.
9. The composition of claim 7 wherein said compound is 5-phenylaminotetrazole.
10. The composition of claim 7 wherein said compound is 5-m-tolylaminotetrazole.
11. The composition of claim 7 wherein said compound is 5-cyclohexylaminotetrazole.
12. The composition of claim 7 wherein said compound is 5-m-methoxyphenylaminotetrazole.

References Cited by the Examiner

Finnegan et al.: Journal Of Organic Chemistry, Baltimore 2, Md., The Williams & Wilkins Co., 1953, pp. 780–781.

Garbrecht et al.: Journal Of Organic Chemistry, Baltimore 2, Md., The Williams & Wilkins Co., 1953, pg. 1015.

A. LOUIS MONACELL, *Primary Examiner.*

S. E. HEYMAN, *Assistant Examiner.*